United States Patent [19]

Downing

[11] Patent Number: 5,664,373

[45] Date of Patent: Sep. 9, 1997

[54] INFLATABLE MOLD FOR USE IN SPACE

[76] Inventor: Brian B. Downing, 823 Emperor Dr., Suisun, Calif. 94585

[21] Appl. No.: 293,457

[22] Filed: Aug. 22, 1994

Related U.S. Application Data

[63] Continuation-in-part of Ser. No. 932,682, Aug. 20, 1992, Pat. No. 5,339,574.

[51] Int. Cl.$^6$ .............................. E04B 1/34; E04G 11/04; B28B 21/82
[52] U.S. Cl. .................. 52/2.15; 52/2.22; 52/742.14; 52/745.13; 264/34; 264/35
[58] Field of Search .............................. 52/2.15, 2.22, 52/742.1, 742.13, 742.14, 745.05, 745.13, 745.19; 264/34, 35, 262, 267, 277, 253, 314

[56] References Cited

U.S. PATENT DOCUMENTS

| | | | |
|---|---|---|---|
| 1,219,272 | 3/1917 | Edison | 52/742.14 X |
| 3,110,552 | 11/1963 | Voelker. | |
| 3,257,481 | 6/1966 | Chang | 52/2.15 X |
| 3,329,750 | 7/1967 | Growald. | |
| 3,909,992 | 10/1975 | Stachiw | 52/2.15 |
| 4,102,956 | 7/1978 | Heifetz | 52/2.15 X |
| 4,657,435 | 4/1987 | Chang | 52/2.15 X |
| 4,825,599 | 5/1989 | Swann. | |
| 5,339,574 | 8/1994 | Downing | 52/2.15 |

FOREIGN PATENT DOCUMENTS

| | | | |
|---|---|---|---|
| 2548272 | 5/1976 | Germany | 52/2.15 |
| 8301971 | 1/1985 | Netherlands | 52/2.15 |
| 8503220 | 6/1986 | Netherlands | 52/2.15 |

*Primary Examiner*—Carl D. Friedman
*Assistant Examiner*—Kevin D. Wilkens
*Attorney, Agent, or Firm*—Richard C. Litman

[57] ABSTRACT

Modular Structures preferably usable to form human habitations in outer space are fabricated by molding. A mold comprising progressively surrounding flexible walls defines progressively surrounding cavities. A selected cavity or cavities are inflated or pressurized, as with gas, to distend to assume a predetermined configuration. Another selected cavity or cavities are injected with mold material, which is then allowed to harden. A pressurized cavity or cavities may be evacuated and then filled with mold material. In this manner, a strong structure is progressively formed is subsequent injection and hardening steps. In alternative embodiments of the molding method, supports or reinforcing members are placed within cavities prior to inflation and material injection. These supports space apart adjacent flexible mold walls and force the flexible walls to assume a desired configuration under inflated conditions. The supports can be rigid and solid; rigid, telescoping, and biased to expand; and flexible and resilient. The supports can thus resist tensile and compressive forces imposed on the flexible walls by inflation. In further alternative embodiments, magnets are placed within the mold, employing attraction and repulsion to maintain desired alignment of molded parts and to urge selected portions toward and away from others. A system of cylindrical and spherical hollow objects can be formed and connected. Connection can be solid or rotatable. The habitations can be rotated independently of one another even though connected, when an appropriate connection is provided.

8 Claims, 15 Drawing Sheets

INFLATABLE MOLD FOR USE IN SPACE

CROSS REFERENCE TO RELATED APPLICATION

This application is a Continuation-in-Part of application Ser. No. 07/932,682, filed Aug. 20, 1992 now U.S. Pat. No. 5,339,574.

BACKGROUND OF THE INVENTION

1. Field of the Invention

The present invention relates to inflatable and flexible molds. More particularly, the present invention relates to the application of employing such molds in space to form objects including human habitations.

2. Description of the Prior Art

The prior art has generally not anticipated zero gravity manipulation of molds, sections and parts thereof, and molding operations generally under these conditions. In the prior art, flexible molds having multiple layers of flexible material defining at least one inner cavity therebetween are known. The molds can have fluid mold material injected between any two layers to fill one of the cavities. If a plurality of cavities are provided, then all those cavities could also be filled with mold material or with gasses for exerting pressure to urge the flexible mold into a desired configuration. When mold material hardens, a solid structure assuming a final shape or configuration corresponding to the mold is obtained. Various methods of forming the final solid structure employing plural flexible molds is shown in the prior art.

U.S. Pat. No. 4,825,599, issued May 2, 1989 to Jack T. Swann, Jr., discloses a flexible mold which is inflated after being transported to outer space. The mold and process of using the same rely upon the low gravity and vacuum properties of space.

U.S. Pat. No. 3,110,552, issued on Nov. 12, 1963 to Walter D. Voelker, discloses a flexible mold usable in outer space. There are inner and outer mold layers between which foam is injected through an entry port. A vent may be provided to permit the escape of gasses. Fibers or webs may be placed between inner and outer layers to influence the final shape prior to hardening of the injected material. The inner layer may be inflated to offset pressure generated by foam mold material.

U.S. Pat. No. 3,329,750, issued Jul. 7, 1967 to Martin C. Growald, discloses a flexible mold for constructing a building structure. Growald also employs inflation to produce a desired configuration. After inflated cavities are deflated, they may be filled with foam mold material.

None of the above inventions and patents, taken either singly or in combination, is seen to describe the instant invention as claimed.

SUMMARY OF THE INVENTION

The present invention discloses method and apparatus for utilizing flexible, inflatable molds forming at least one airtight cavity. Inflatable molds offer two advantages. One is that inflation causes distension of the mold into a predetermined configuration that may be achieved only with difficulty if methods of mold erection other than inflation are employed. Secondly, a mold assuming compact dimensions can be more easily transported into space.

In a first embodiment, the product of the mold is a habitation. In a further embodiment, habitation modules are joined together at rotatable joints, open in the center to enable access or passage therethrough from one module to an adjacent module. A mold having a cylindrical outer configuration is employed to form a tubular object, that is, generally annular, but capped at both ends. This mold features three walls, there being two annular cavities defined between the outermost wall, the central wall, and the innermost wall. The innermost wall further defines a third, cylindrical cavity therein.

The outermost cavity is pressurized with gas, and forces the outermost and central walls into a predetermined configuration. The next cavity is provided with mechanical reinforcing members to hold a shape or configuration.

Mold material is then injected into the middle cavity and allowed to harden over time. Once mold material hardens, pressurizing gas filling an adjacent cavity can be evacuated. The cavity or chamber previously employed to contain pressurizing gas can then in turn be filled with mold material. This process eventually forms a multilayered, solid object having external walls. This method avoids the necessity of transporting and handling the final, total amount of mold material in one step, which could entail the requirement for very large transport vehicles. The method enables lesser amounts to be employed in successive operations without compromising the strength of the final molded object.

The object so formed may be placed into service by itself. In still a further embodiment, modules may be fabricated by the steps outlined above, and joined together to form a final structure. Where the final structure comprises individual habitable modules, novel connecting joints enable connection of modules, rotation of one module with respect to the other, and communication between modules, all accomplished simultaneously.

In still another embodiment, plural habitations can be formed within a single inflatable section by alternating concentric spaces between habitations and inflatable mold walls.

The present invention contemplates that modular habitations will take the form of large and small cylinders and spheres, communicably joined to one another. Thus, both like and unlike components are connected together. Connectors providing leak-tight connection are of either the fixed or solid type, or of the type enabling rotation between one cylinder or sphere and an adjacent cylinder or sphere. As employed hereinafter, the term "hard connection" will refer to fixed or solid connection, and the term "soft connection" will refer to rotatable connection between habitations.

The ability to rotate is important in accommodating rotation which will impart centrifugal forces serving in the capacity of an artificial gravitational field. Motors and gears, as well as generators or inflatable tires are incorporated into the habitations for initiating, maintaining, and changing rotation as required, as well as powering the habitation.

Construction in outer space is fostered because large, intricate structures having significant bulk and requisite strength can be manufactured by the novel molding method, while not requiring transport into space of large masses of either raw materials or finished structures.

Accordingly, it is a principal object of the invention to provide flexible molds which may be utilized in outer space to form structures suitable for human habitation.

It is another object of the invention to provide a system of internal mechanical structural members which support a flexible mold in a desired shape or configuration.

It is a further object of the invention to form mutually compatible modules.

Still another object of the invention is to enable rotatable connection of modules, while accommodating passage of objects through the connection from module to module.

An additional object of the invention is to enable a large object to be molded in successive injection and hardening operations.

It is again an object of the invention to enable a flexible mold to assume and maintain predetermined configuration after inflation.

Still another object of the invention is to join together cylindrical and spherical habitations in space.

A further object of the invention is to fabricate habitations and connectors in situ in outer space.

Yet an additional object of the invention is to enable rotating connections between modular habitations in outer space, as well as hard connections between modular habitations, as desired.

It is again an object of the invention to provide mechanisms for causing and changing rotation of modular habitations in outer space.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
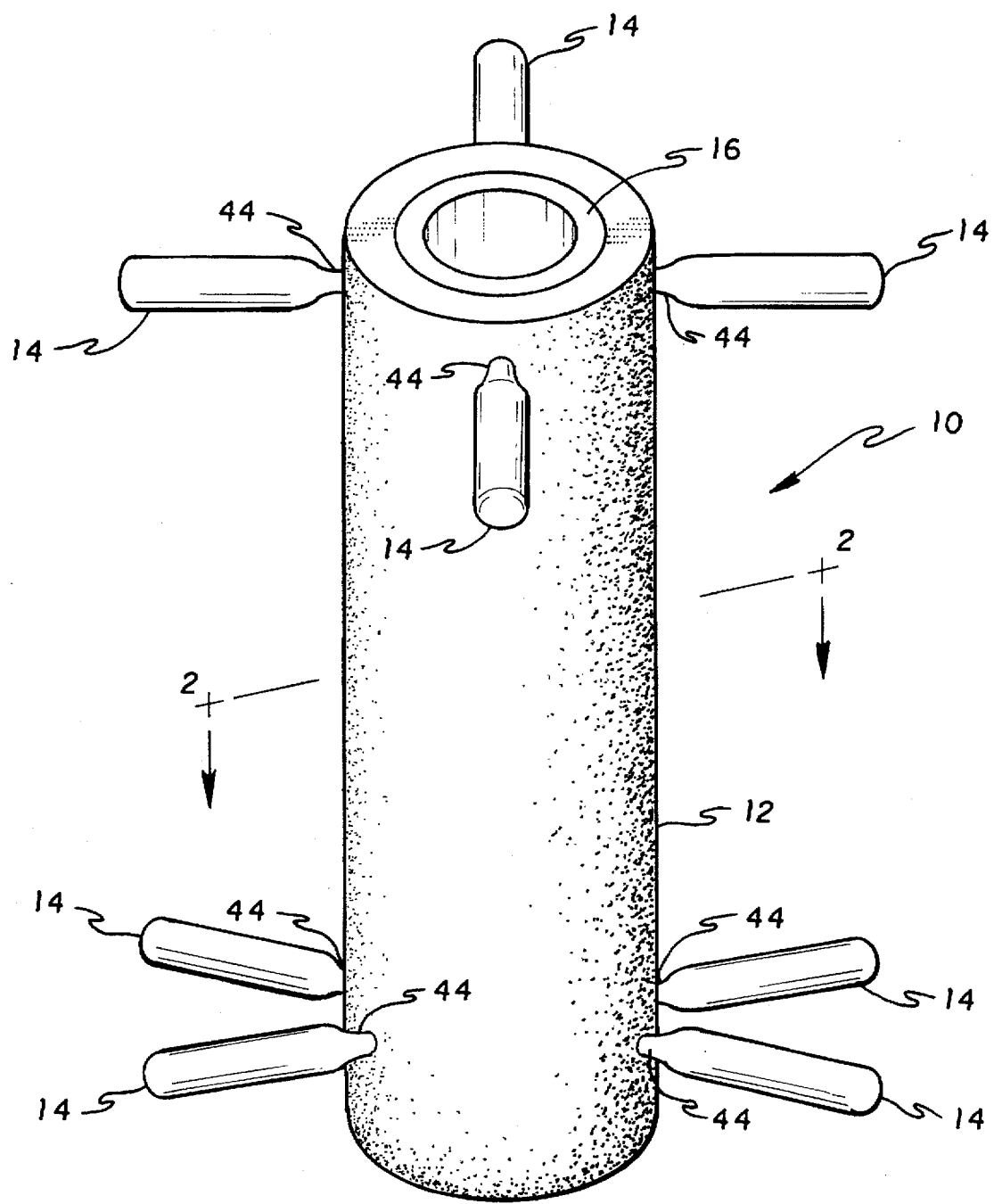
FIG. 1 is a perspective view of a first embodiment of the invention.

As shown in FIG. 1, a flexible mold for a habitation intended to be used in outer space may be transported into space in a collapsed form. Once in space, one of the cavities is inflated so that the mold assumes a predetermined shape. In the embodiment of FIG. 1, a cylindrically shaped habitation 10 is illustrated and has an outermost wall 12 including an airlock hatch opening 16 at one end thereof. Such an airlock opening is known in the prior art, as disclosed in the patent to Swann, Jr., which is hereby made of record and incorporated herein by reference.

Located on outer wall 12 are sealable hose connections to which pressurized tanks 14 containing, depending upon the step being performed, either pressurizing gasses or composite mold materials are connected. Obviously, any tank 14 can be renewed after depletion by a tank 14 containing the same contents as employed previously, or different contents.

Figure 2:
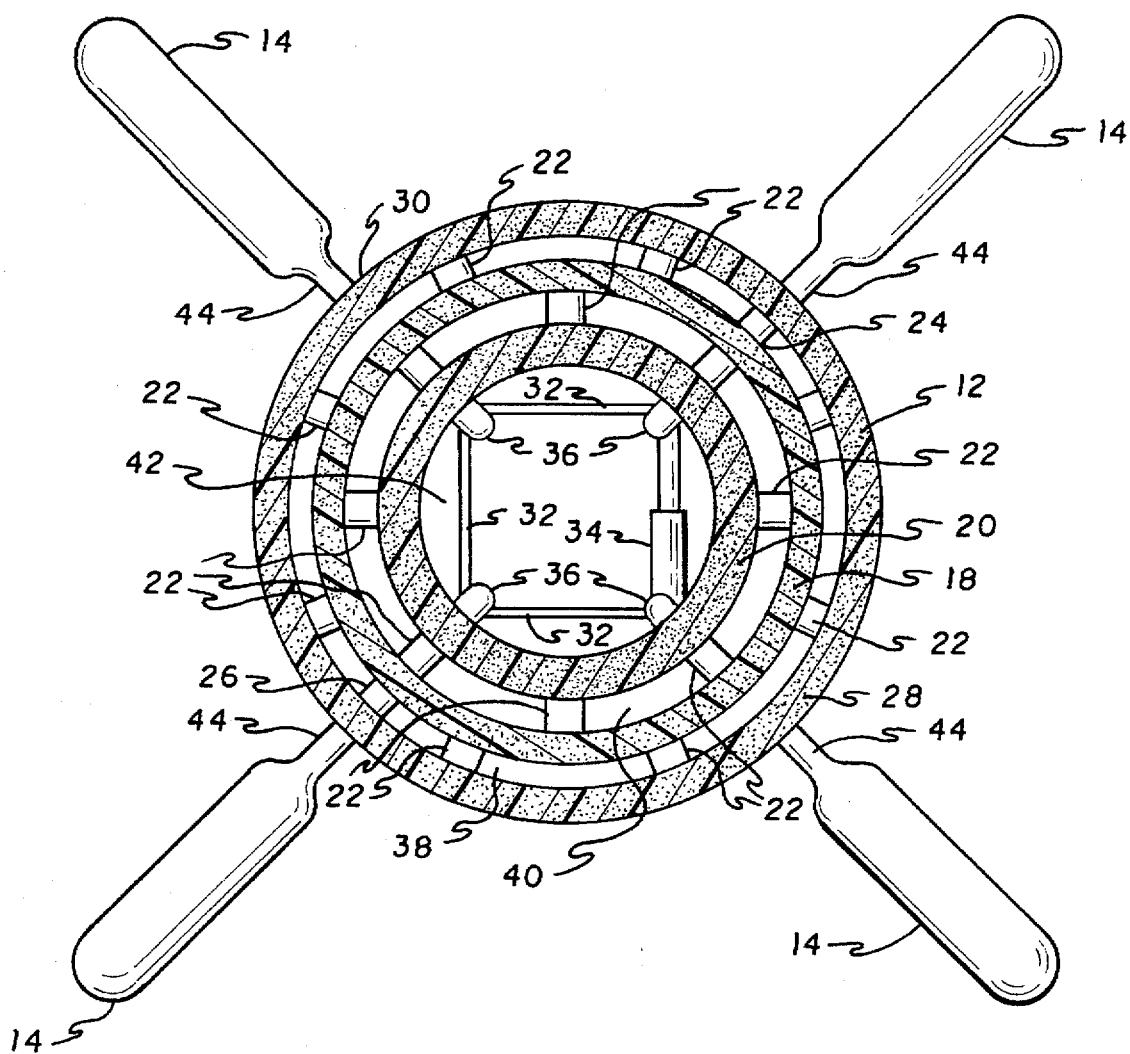
FIG. 2 is a cross sectional view of the first embodiment, taken along line 2—2 of FIG. 1.

As shown in FIG. 2, an innermost cavity 42 is surrounded by an innermost flexible wall layer 20. An outer flexible wall layer 18 surrounds the innermost wall layer 20. In turn, outer wall 12 surrounds both outer wall layer 18 and innermost wall layer 20. Each of the pressurized tanks 14 is employed either to pressurize a selected cavity existing between two adjacent wall layers or to inject mold material for fabrication by molding.

In the preferred embodiment, the outermost cavity 38 is first filled with pressurizing gas from opposed tanks 14 connected at suitable hoses or like fittings 28,30. Valved connectors 44 provided on each of tanks 14 control dispensation of material injected under pressure into the mold. Valved connectors 44 will be understood to include both a suitable valve for enabling and stopping flow of contents from a tank 14 into the mold, and an orifice opening into a selected cavity formed in the mold.

Mechanical supports 22 are attached between the middle wall layer 18 and outer wall layer 12 in order to space these layers 12,18 apart at a predetermined dimension. It should be noted that supports influence the configuration of the mold as it is inflated in several different ways, and may assume any of several different configurations and materials. Other supports described hereinafter will be formed differently from supports 22, depending upon the precise nature and purpose thereof. Supports comprise rigid discs or short cylinders for maintaining flexible mold walls spaced apart in a generally concentric relationship. All supports share the common function of maintaining the flexible walls of the mold in a desired and predetermined configuration when the mold is inflated.

Additional supports are also placed between the middle wall 18 and the innermost wall 20. These supports may be flexible webs attached to adjacent flexible wall layers, or may be rigid members. In either case, the inner cavity expands to assume a preferred configuration as it tracks the configuration of the outermost cavity during inflation thereof.

Additional supports can also be placed the innermost cavity to impart final configuration. As shown in FIG. 2, fasteners 36 are employed to attach supports within the middle cavity. Webs 32 and expandable rods 34 provide these additional supports. Expandable rods 34 may be of the type including gas and hydraulic springs, as employed in shock absorbers in automotive suspensions. Rods 34 resist both compressive forces imposed from without tending to collapse innermost cavity 42, and tensile forces imposed from within by pressurizing gasses.

The final configuration of cavity 40 is thus determined by the configuration of walls 12 and 18 when the outermost cavity is inflated, and by innermost cavity 42 and by the various supports attached to the various walls.

When the configuration of cavity 40 is finalized, fluid mold material is injected thereinto and is allowed to harden. Conduit fittings 24,26 open into middle cavity 40 to enable the mold material to be injected into this space.

Injection of both pressurizing gas and mold material is preferably accomplished from opposed pairs of tanks 14. Thrust from any one tank 14 will tend to oppose thrust from its opposed counterpart, so that no linear or angular acceleration of the mold results.

Once the mold material within middle cavity 40 has hardened, the inner hull of the habitation 10 is formed. Inflated cavity 38 is evacuated, as by allowing gas to escape through fittings 28 and 30. Again, these fittings 28,30 are arranged to oppose one another to cancel thrust created by gas jets passing therethrough. Open orifices formed in fittings 28,30 are then closed.

Additional tanks 14 containing fluid mold material are then connected to fittings 28 and 30. Outer cavity 38, formerly inflated for pressurization purposes, is then injected with mold material.

Figure 3:
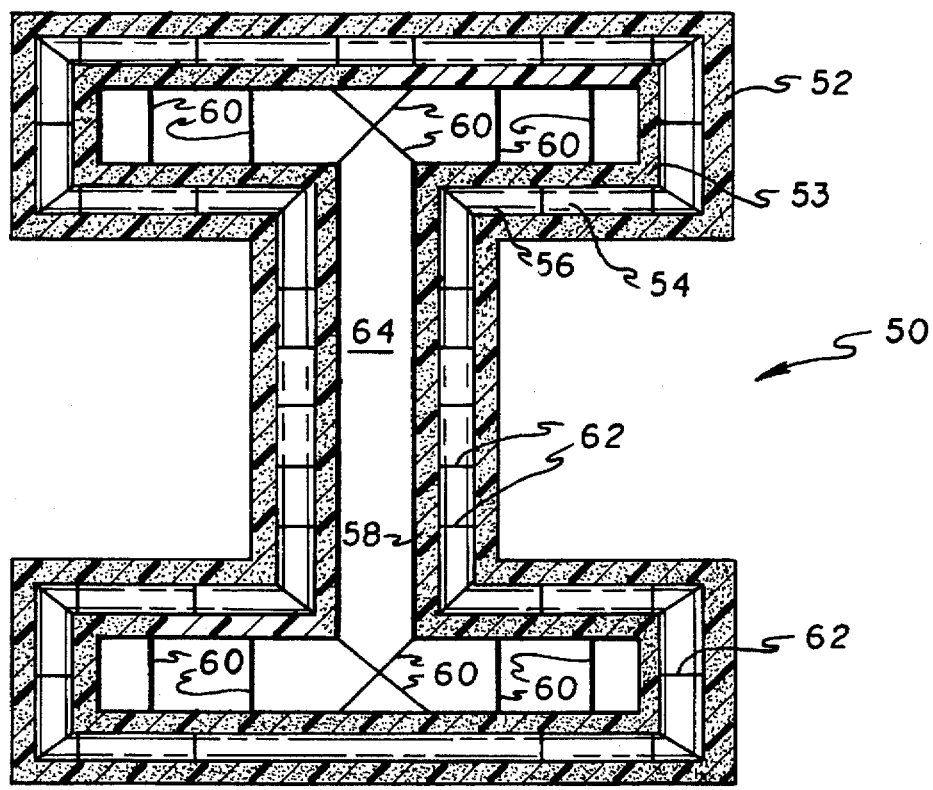
FIG. 3 is a cross sectional view of a second embodiment of the present invention.

As shown in FIG. 3, a modular component such as an I-beam 50 can be constructed using the novel mold. As illustrated in this FIG., an outer flexible wall 52 completely encloses an inner flexible wall 58. In the embodiment depicted in FIG. 3, an intermediate wall 54 is located inside outer wall 52. Outermost cavity 56 is pressurized. Internal supports 62, which may comprise flexible webs or rigid members, are attached to outer wall 52. This prevents excessive bulging of the mold, and also influences the shape of innermost cavity 64. Internal supports 60 are placed within innermost cavity 64, to control wall 58.

Outermost cavity 56 is inflated, and innermost cavity 64 is injected with fluid mold material. After hardening, cavity 56 is evacuated, and mold material is injected in place of the pressurizing gas. A solid I-beam is thus formed in progressive injection and hardening cycles.

Figure 4:
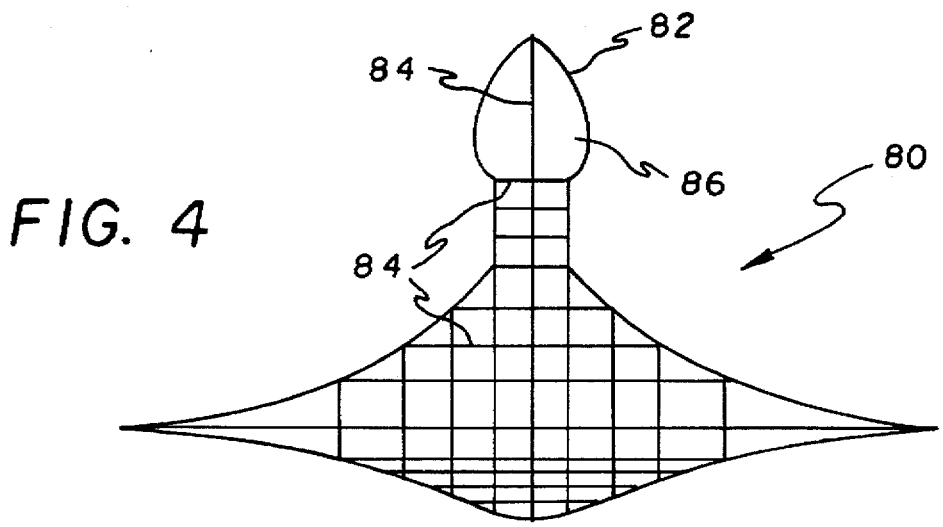
FIG. 4 is a diagrammatic cross sectional view of a third embodiment present invention.

FIG. 4 illustrates the use of supports in advantageously reinforcing a mold. Flexible mold 80 has a wall 82 which is distended by inflation. Innermost supports 84 are placed at locations constraining the final outer boundary of cavity 86 defined by wall 82. Supports prevent distension of wall 80, so that a more complex shape including curves can be formed employing the method and apparatus discussed with reference to FIGS. 1–3.

Figure 5:
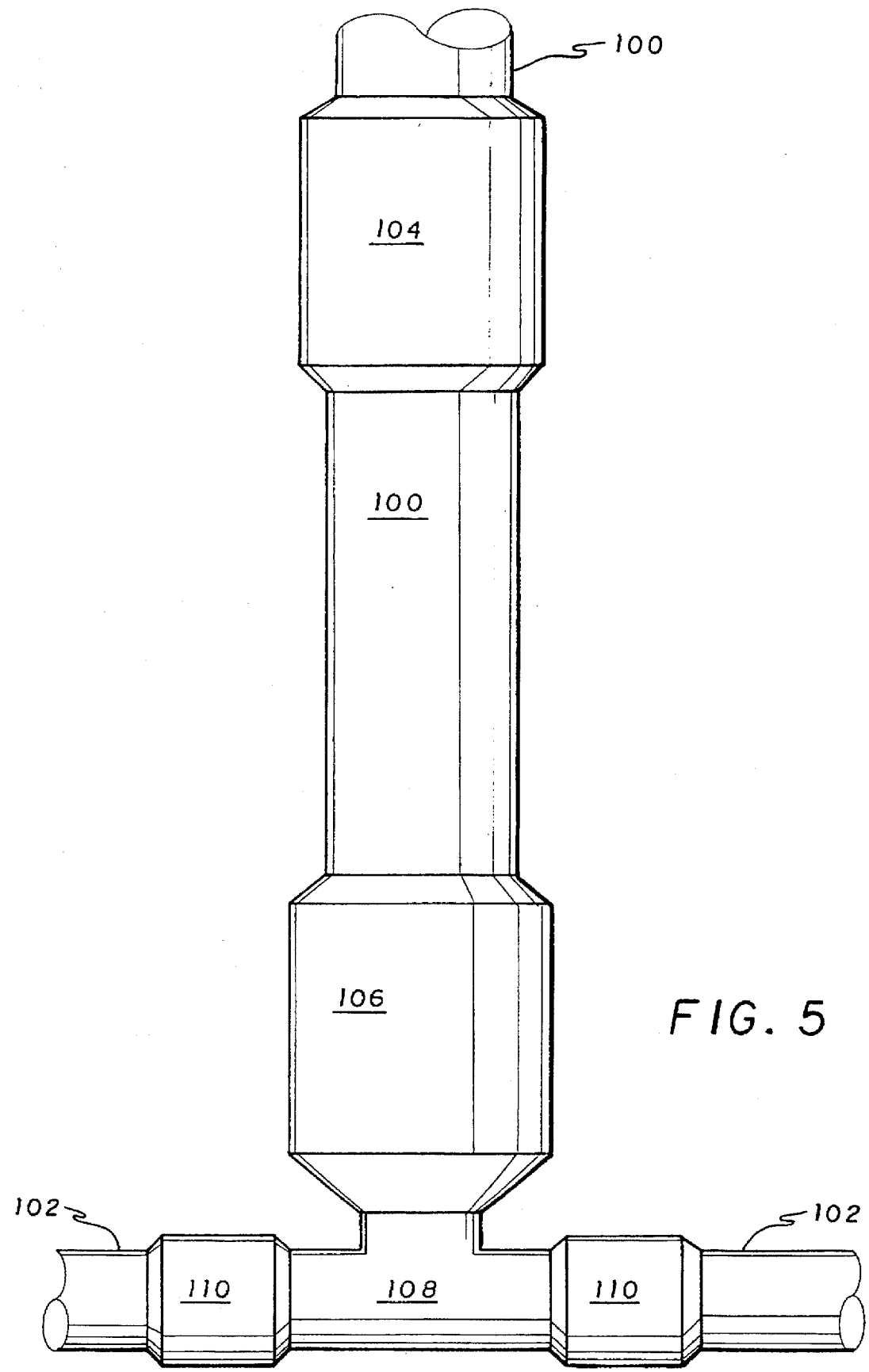
FIG. 5 is a side elevational view of a completed molded assembly including several sizes of cylindrical habitations, connectors adapters.

In the most advantageous application of the novel method, large, hollow modules are molded in outer space. Referring now to FIG. 5, one basic shape of modules includes large and small cylindrical habitations 100,102. Habitations 100 and 102 are joined to adjacent habitations by external connectors 104, for joining to a like habitation 100, and adapting connectors 106, for joining to a cylindrical module of reduced diameter.

In the present example, adapting connector 106 connects habitation 100 to a tee connector 108. Tee connector 108 enables manifolding or branching, with subsequent connection to smaller cylindrical habitations 102. When connecting smaller cylindrical modules together, a connector 110 is employed. Connector 110 is similar in structure to connector 104, but is employed in hard mounts, where no rotation between connected sections occurs.

Figure 6:
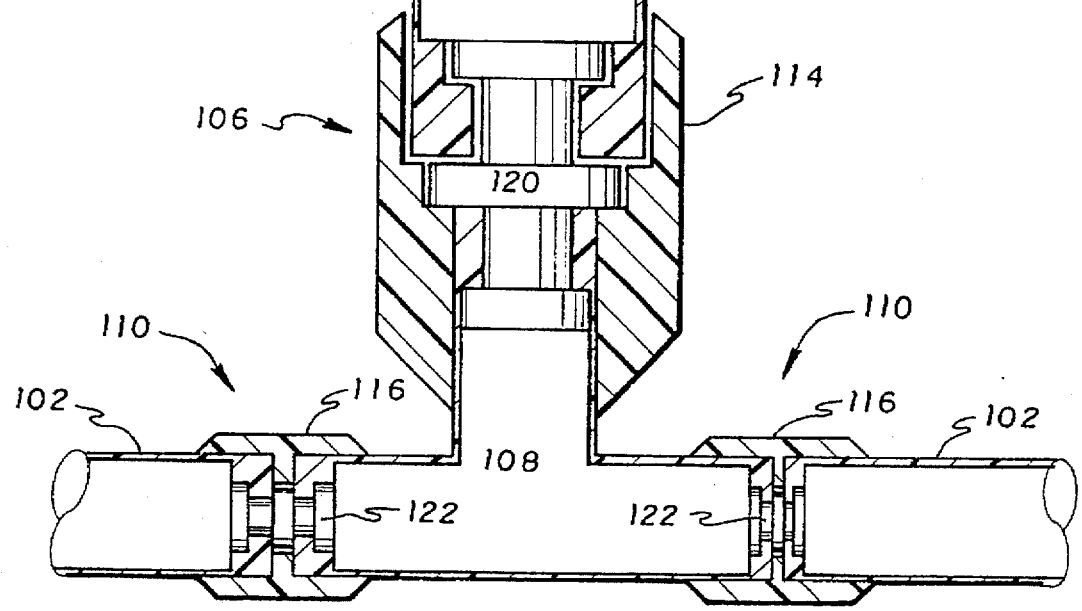
FIG. 6 is a cross sectional view of the assembly of FIG. 5.

FIG. 6 shows the components of FIG. 5 in cross section. This depiction more clearly shows the overlapping relationship of a connector 104, 106, or 110 to an associated habitation 100 or 102. Also, connectors 104, 106, and 110 are seen to include an external collar 112,114,116 and a corresponding internal member 118,120,122.

Figure 7:
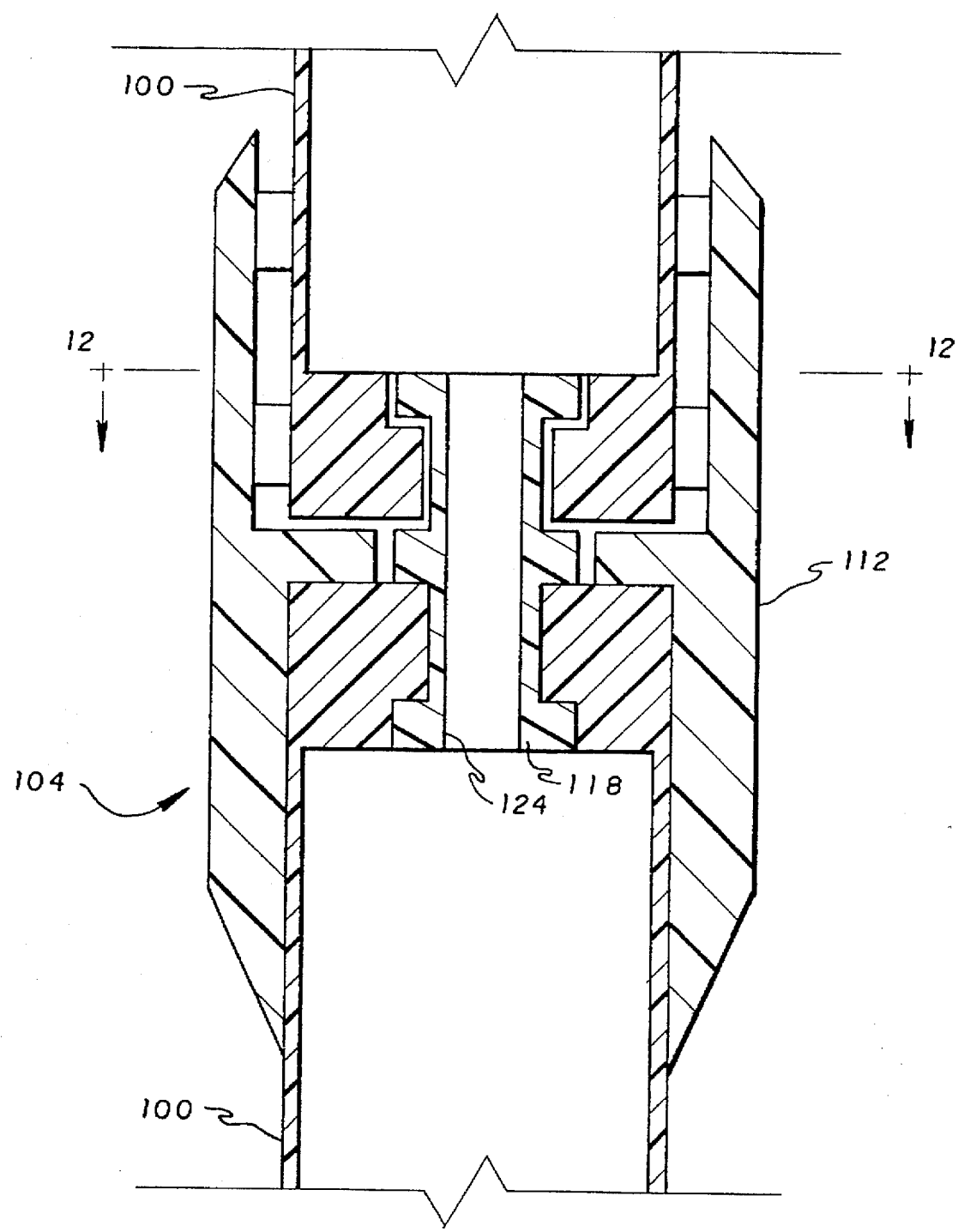
FIG. 7 is a cross sectional detail view taken from the upper portion of FIG. 6, and drawn to enlarged scale.

FIG. 7 shows connector 104 in greater detail. Member 118 is an interlocking member which is advantageously molded in place to accomplish the mechanical interfit necessary to achieve interlocking. It will also be seen that member 118 includes an open passageway 124 enabling access and passage between adjacent habitations 100 that are connected together. The same principles and structural details apply to connectors 106 and 110, and their associated habitations 100 and 102, except that connector 110 is for hard mount applications. In this situation, the connector and the two members connected together are solidly fixed to one another, and no rotation occurs.

In some cases, it will be desired to enable a habitation to rotate with respect to an adjacent habitation, as to create artificial gravity, and to exploit this motion to generate power. Two types of connections are therefore provided. A solid connection requires merely that the associated connector be solidly fixed to a habitation. If the adjacent habitation is rotatable with respect to the first habitation, then connection of the connector to the adjacent, rotatable habitation accommodates this rotatable union by sealed bearing packages or assemblies. Hereinafter, a solid connection will be referred to as a "hard" connection, and rotatable connection will be referred to as "soft" connection.

Figure 8:
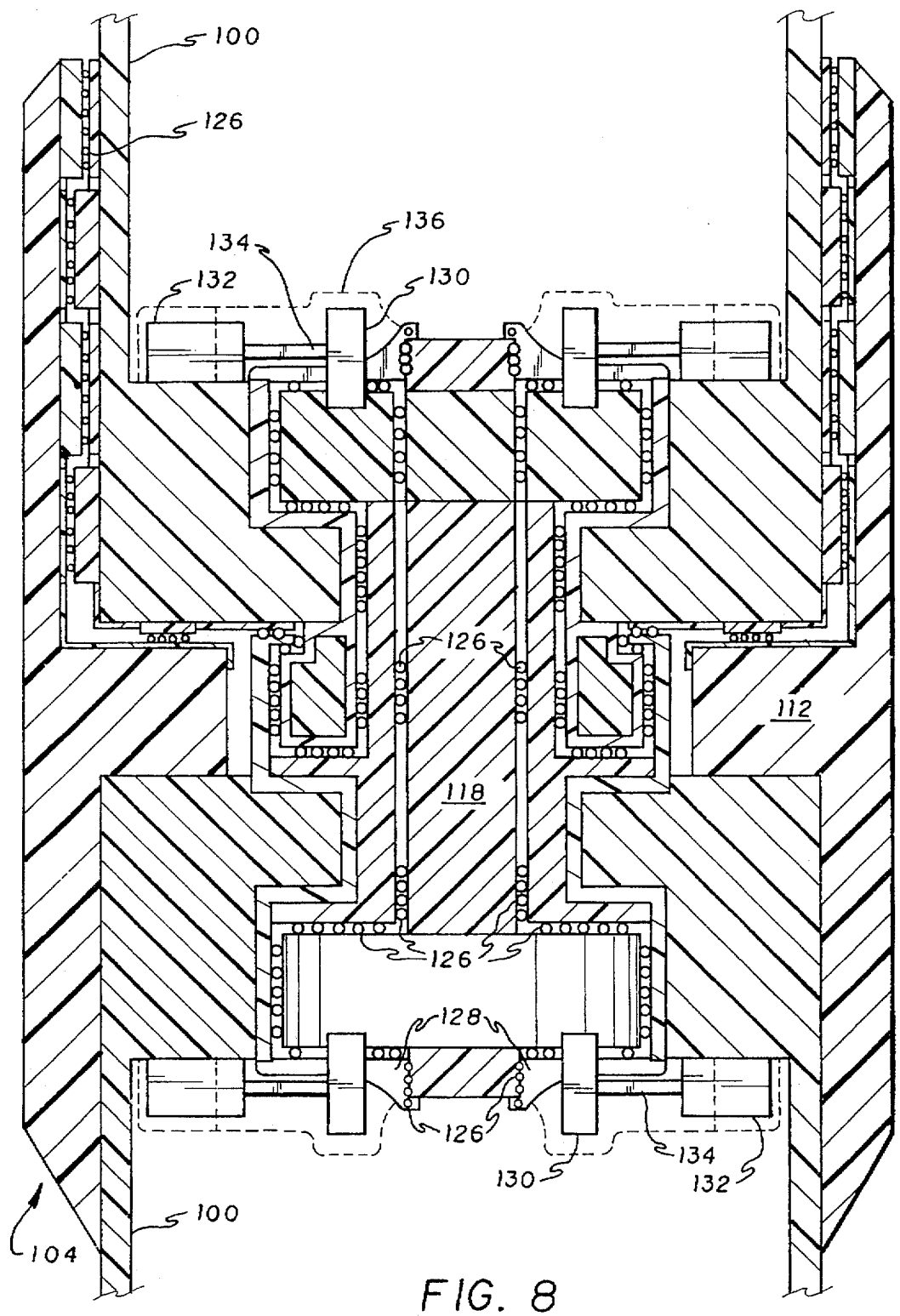
FIG. 8 is a cross sectional detail view of FIG. 6, drawn to still greater scale and further including components omitted from FIG. 6.

Bearing arrangement is illustrated in FIG. 8, which shows the components of FIG. 7. Bearings 126 are disposed within spaces defined between ends of habitations 100 on races 128. Both habitations 100 rotate with respect to connector components independently of one another. It will be seen that connection of connector 104 to lower habitation 100 is a hard connection, and that connection of upper habitation 100 thereto is a soft connection.

Also shown in this view are gears or inflatable tires 130 which are connected to respective motors 132 by shafts 134.

Connector members 118 have incuse reliefs (not shown) corresponding to the teeth (not shown) of gears or inflatable tires 130, so that gears or inflatable tires 130 obtain purchase with respect to members 118. Housings 136 of gears or inflatable tires 130 and motors or generators 132 are shown in broken lines.

Figure 9:
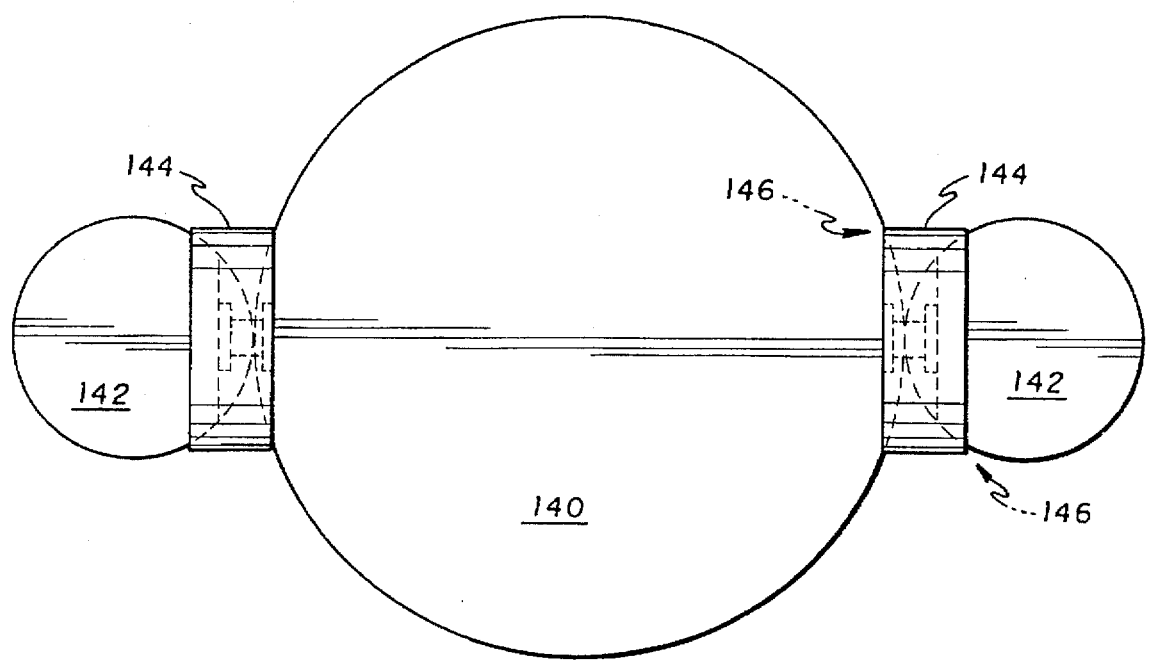
FIG. 9 is an end elevational view of another embodiment of the invention, wherein two relatively small spherical habitations are connected to a larger spherical habitation.

Turning now to FIG. 9, habitations or modules include large and small spheres 140,142, joined at adapting connectors 144. Connectors 144 are designed for joining spheres rather than cylinders, there being curved shoulders 146 conforming to the outer surfaces of the respective spheres 140 or 142.

Figure 10:
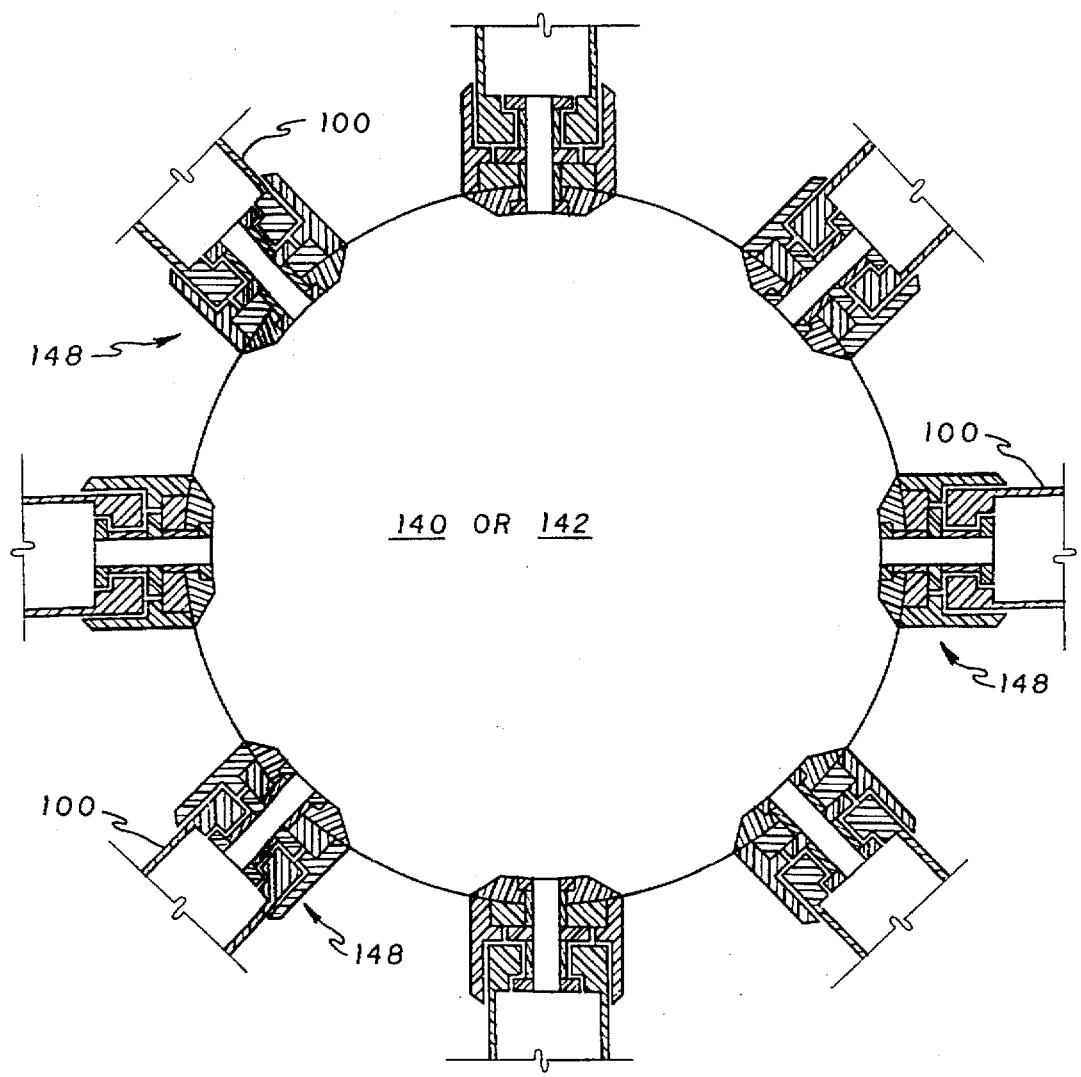
FIG. 10 is a generally cross sectional view of still another embodiment of the invention, wherein plural cylindrical habitations are joined to a single spherical habitation.

Of course, spherical habitations may also be joined to cylindrical habitations, as seen in FIG. 10. A spherical habitation 140 or 142 is connected to cylindrical habitations 100 by adapting connectors 148.

Figure 11:
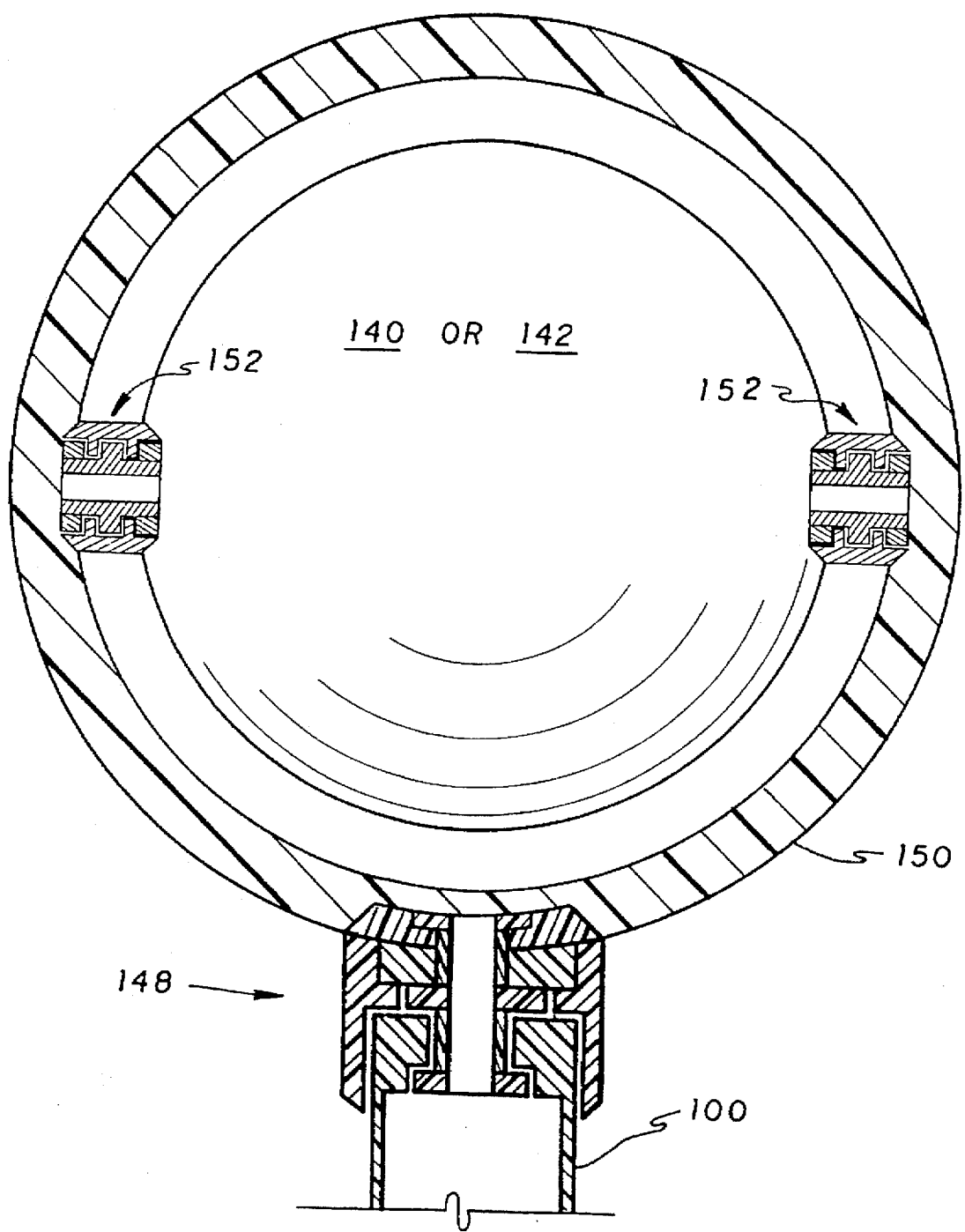
FIG. 11 is a generally cross sectional view of still another embodiment of the application, wherein a spherical habitation is supported within another habitation.

FIG. 11 illustrates concentric location of a spherical habitation 140 or 142 within a cylindrical member 150, which could be either a cylindrical habitation or a connector. Habitation 140 or 142 is mounted within cylindrical member 150 by connectors 152. Further connection to habitation members, such as 100, is made by adapting connectors 148.

Figure 12:
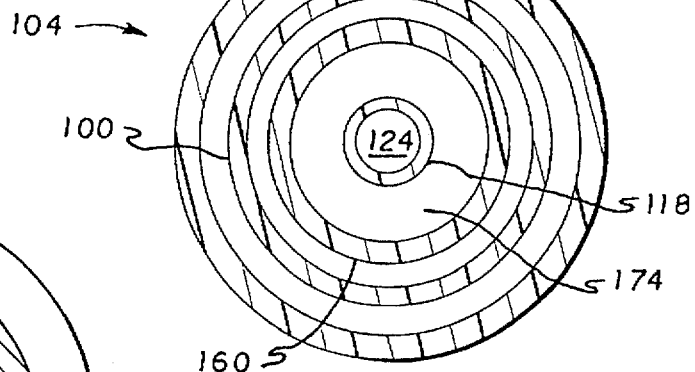
FIG. 12 is a diagrammatic, cross sectional view taken from FIG. 7, showing internal components of the soft connection side of a connector.

Connectors connecting a spherical member to another spherical member or to a cylindrical member require a locking member so that the connector is held securely while leaving opening 124 (see FIG. 7) unobstructed. An internal lock 160, seen in FIG. 12, is for a connector external member, such as connector 104, seen in FIG. 7.

Figure 15:
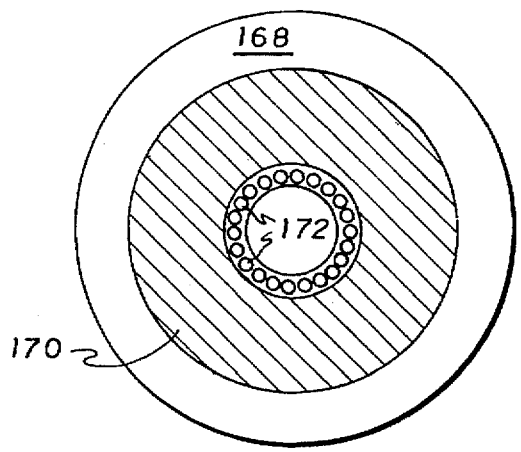
FIG. 15 is an elevational view of a hard mount internal connector depicted in FIG. 8, with the cap of FIG. 13 removed.
Figure 13:
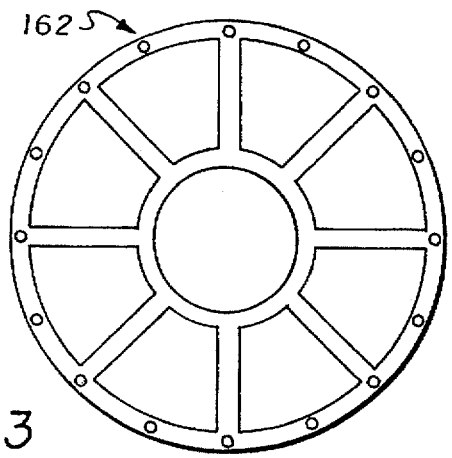
FIG. 13 is a front elevational view of a cap that covers the top of the hard mount side of the internal connector shown in cross section in FIG 8.

An end piece 162, shown in FIG. 13, is for lock 160 of a cylindrical connector, such as connector components seen in FIG. 15. This arrangement is seen in FIG. 8.

Figure 14:
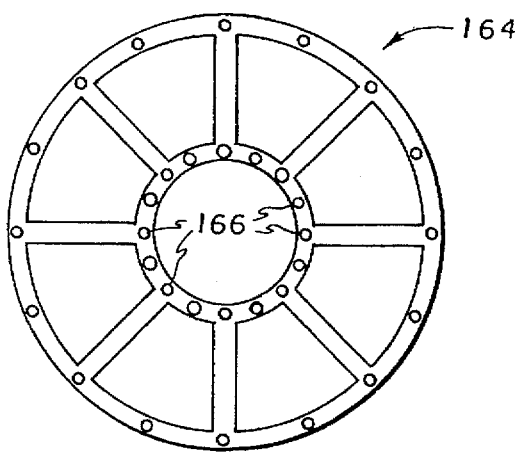
FIG. 14 is a front elevational view of a cap that covers the top of the soft mount side of the internal connector shown in cross section in FIG 8.

A similar end piece 164 is illustrated in FIG. 14. End piece 164 differs from end piece 162 in having bolt holes 166 for mounting to the components of FIG. 16. This arrangement is also seen in FIG. 8.

Figure 16:
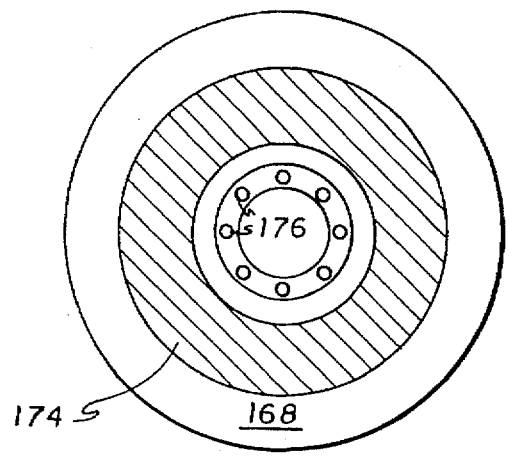
FIG. 16 is an elevational view of a soft mount internal connector depicted in FIG. 8, with the cap of FIG. 14 removed.

Two end views of an internal connector member are seen in FIGS. 15 and 16. The end piece of the hard mounted side of the connector is shown in FIG. 15. When viewed from the end, a bearing package annulus 168, the gear or tire travel path 170 having bearing package incuse gear tooth or tire reliefs discussed above, and one seal 172 of a double sealed bearing are visible. A side cross showing of this arrangement can be seen in FIG. 8.

FIG. 16 shows the components visible at the soft mounted side, comprising bearing package annulus 168, gear or tire path 174, and holes 176 for bolting to the components of FIG. 14. Again, these components may also be seen in FIG. 8.

Figure 17:
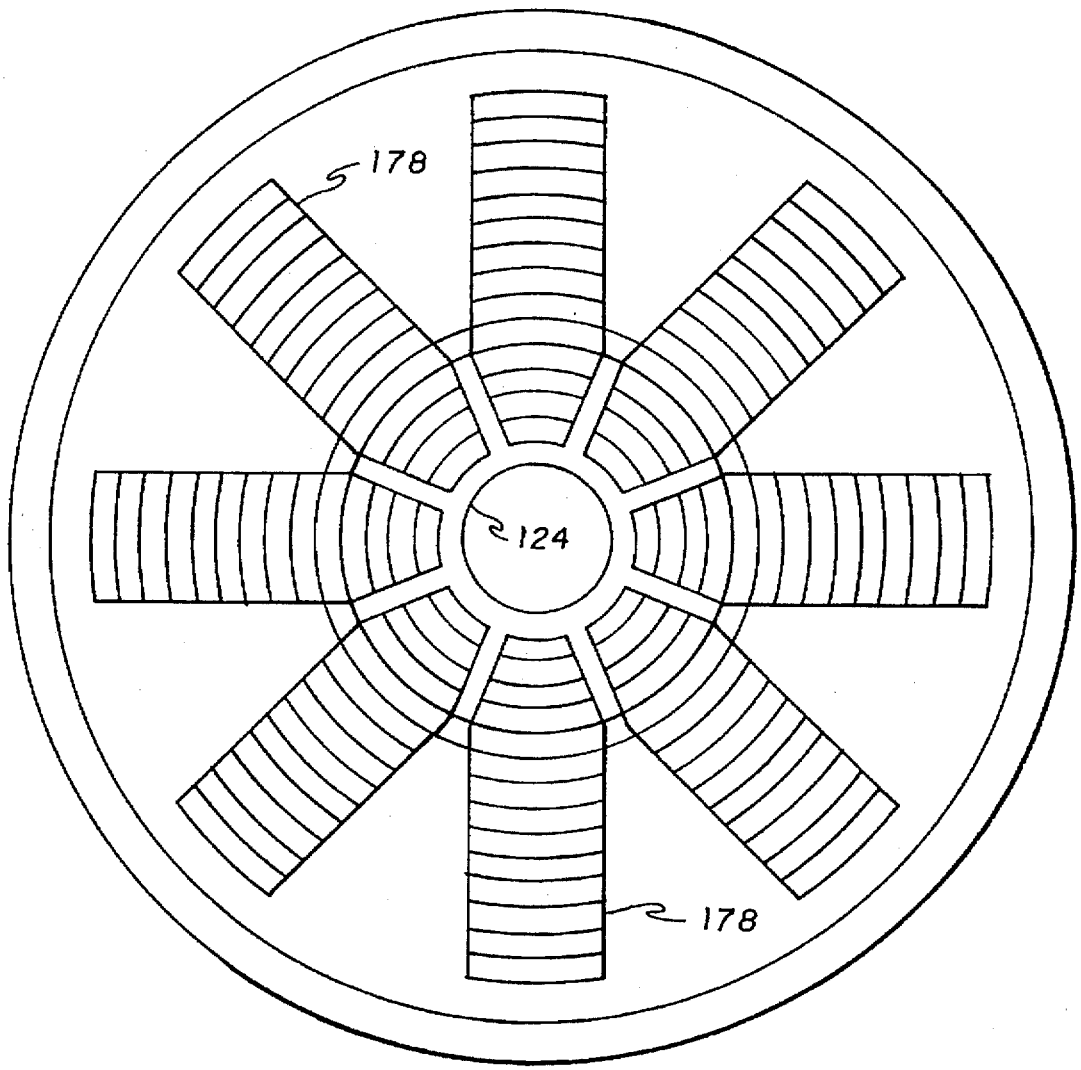
FIG. 17 is an end elevational view of a cylindrical habitation, showing motors and generators disposed upon the end wall.

An end view of a habitation is seen in FIG. 17. Motors and generators 178 are located at the end wall shown in this view. As may be perceived, motors and generators act on the axis of the habitation, but do not obstruct the opening 124 leading to the next habitation (not shown).

Figure 18:
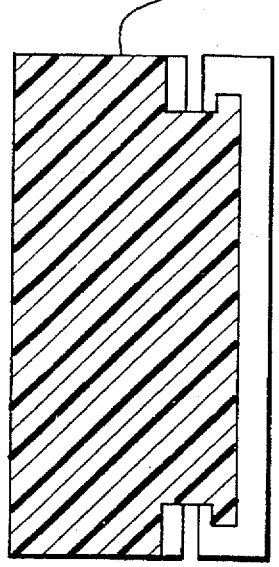
FIGS. 18 and 19 are diagrammatic detail views, partially shown in cross section, of a seal, taken in top plan view and cross section, respectively.
Figure 19:
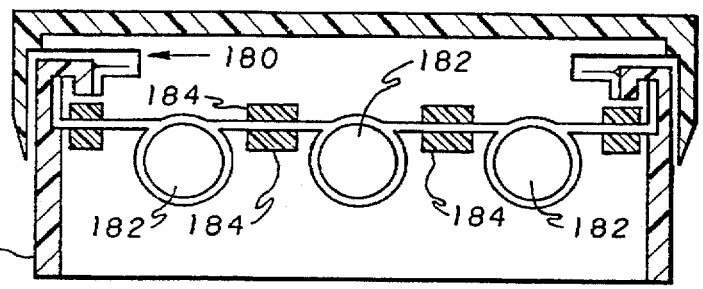

Details of bearing seal packages are shown in FIGS. 18 and 19. Details of a seal 180 are shown both in FIGS. 18 and 19. An external connector member, such as member 112 of connector 104 (shown in FIG. 7), is seen in FIG. 18, which is able to provide an interlock.

Referring now to FIG. 19, which shows in cross section components also shown in FIG. 18, seal 180 is seen to cover a bearing package race occupied by bearings 182 and magnets 184. Magnets 184 are placed in each of the opposing members, oriented to repel a corresponding magnet 184. This action is unlike other magnets placed in the inflatable molds that employ magnetic attraction to assure desired alignment of the members during inflation and hardening of the mold materials. The space located between the various components, exaggerated in the drawings, is caused by mutual repulsion of magnets 184. This space also accommodates lubricant for bearings 182. Bearing channel seals 180 prevent loss of lubricant.

Figure 20:
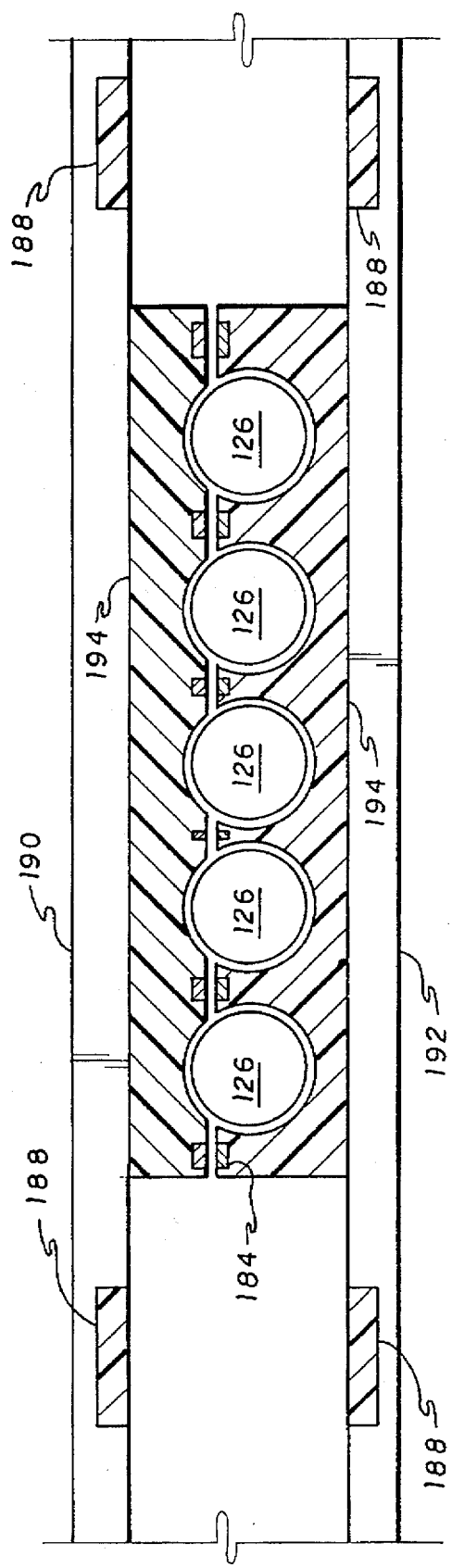
FIG. 20 is a representative showing of components drawn together by attracting magnets, but held spaced apart by other magnets.
Figure 21:
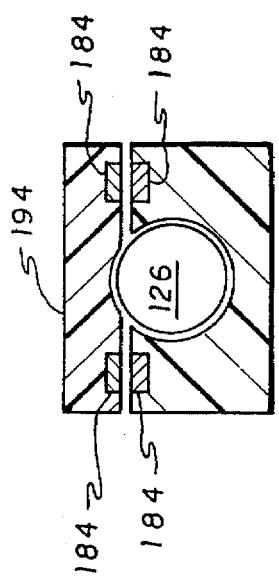
FIG. 21 is an end elevational detail view of the components of FIG. 20.

FIG. 20 shows the use of attracting magnets 188 and repelling magnets 184 for securing together components which rotate with respect to one another. Magnets 118 are of relatively large field strength, and draw together components represented by 190 and 192. Bearings 126 enable rotatable contact between components 190 and 192. To prevent excessive pressure from acting on bearings 126, weaker magnets 184 are oriented to repel one another. Thus, components 190 and 192 are held at a predetermined, spaced apart relation to each other. FIG. 21 shows bearing race 194, bearings 126, and magnets 184 seen in FIG. 20.

The preferred order of assembly is as follows. Connector 104, seen in FIG. 7, is molded first. Then, hard mount habitation section 100 is placed into a preferred location, and is retained there by inflation of appropriate sections of the mold and by attraction of appropriately located magnets. A subsequent molding step then attaches section 100 to external connector 104 seen in FIG. 7.

Internal connector 118 is then attached to the hard mount section of the mold, as seen in FIG. 7. This attachment is performed similarly to connection of external connector 104. That is, mold sections are inflated after connector 118 is inserted into the hard mount connection section. Magnetic attraction is again employed to retain connector 118 in position. The molding in place of otherwise interfering components enables this connection to be achieved. These components are also shown in FIG. 8.

The soft mount side of connector 118, although similar in many ways to the hard mount side, differs by the addition of components accommodating rotation of adjacent habitation sections joined by the connection. A habitation section 100 is shown in FIG. 7.

Section 100 is formed by selective inflation of portions thereof, and by magnets placed therein to assure appropriate alignment of mold sections. Desired positioning of mold parts and insertion of connector 118 is accommodated by this erection procedure.

With the above components arranged in desired relationship to one another, final inflation and injection steps are performed so as to cause the major components to bear against one another. Thus, operating pressure maintaining the bearing packages in operable condition is accomplished. Bearing packages are shown in FIGS. 18 and 19, and individual bearings 126 are seen in FIG. 8.

Operable pressure frees the habitations to rotate with respect to one another. This pressure, although arranged to allow this rotation, does not overcome repulsion of magnets 184 (see FIG. 19). When the major components are appropriately spaced apart by magnetic repulsion, friction free rotation can be achieved. Bearings 182 serve as a backup scheme for enabling non-damaging rotation should the equilibrium of the magnetic forces be temporarily inoperative.

Figures 22, 23:
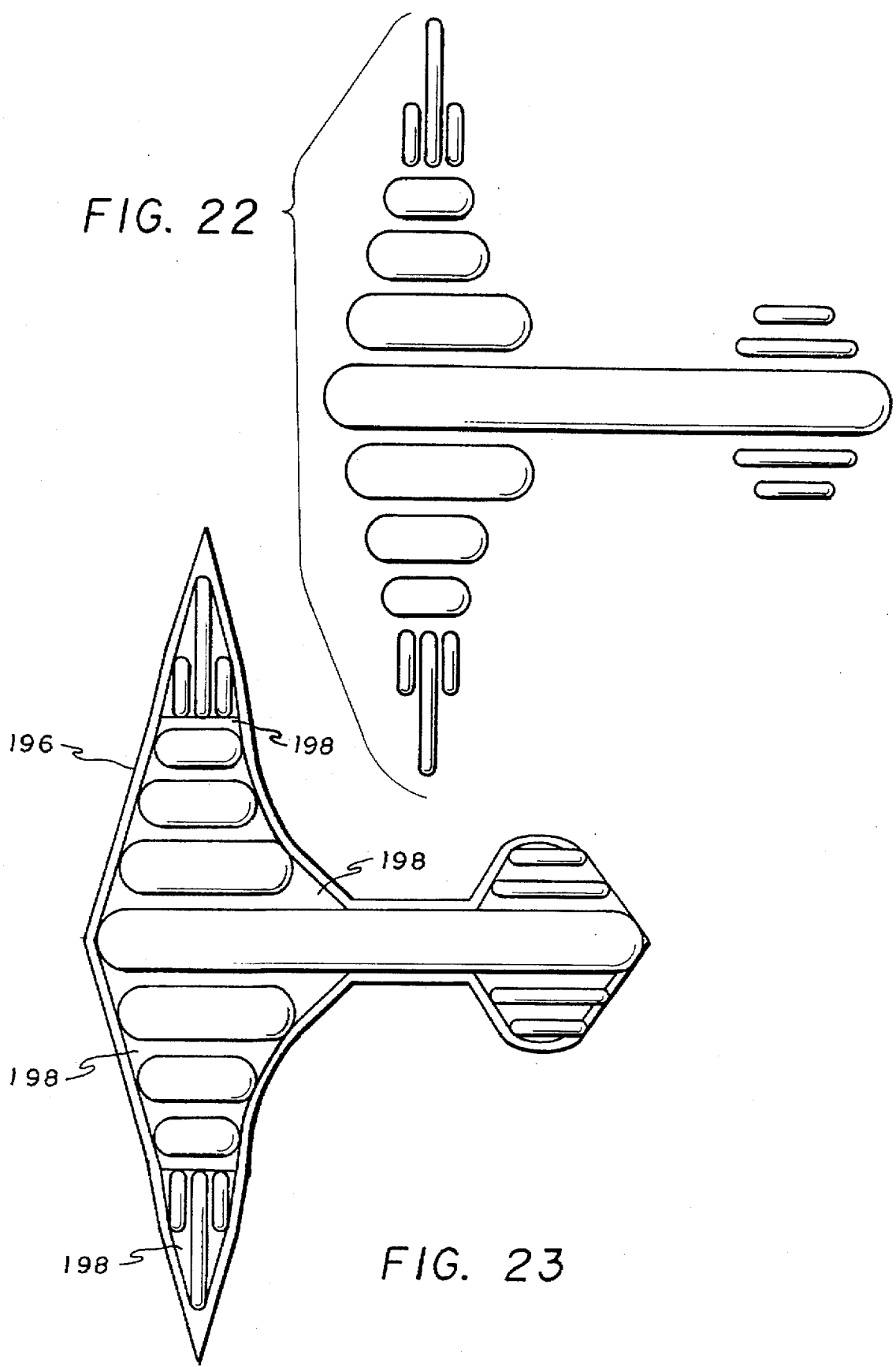
FIG. 22 is a diagrammatic representation of a selected layout of structures which can be formed by the novel process.
FIG. 23 is a diagrammatic representation of the layout of FIG. 22, showing finalized structure.

FIG. 22 illustrates a representative desired layout of habitations. These habitations are formed in the layout, and have an outer skin 196 and internal molded walls 198 after molding operations are complete, as illustrated in FIG. 23.

Figure 24:
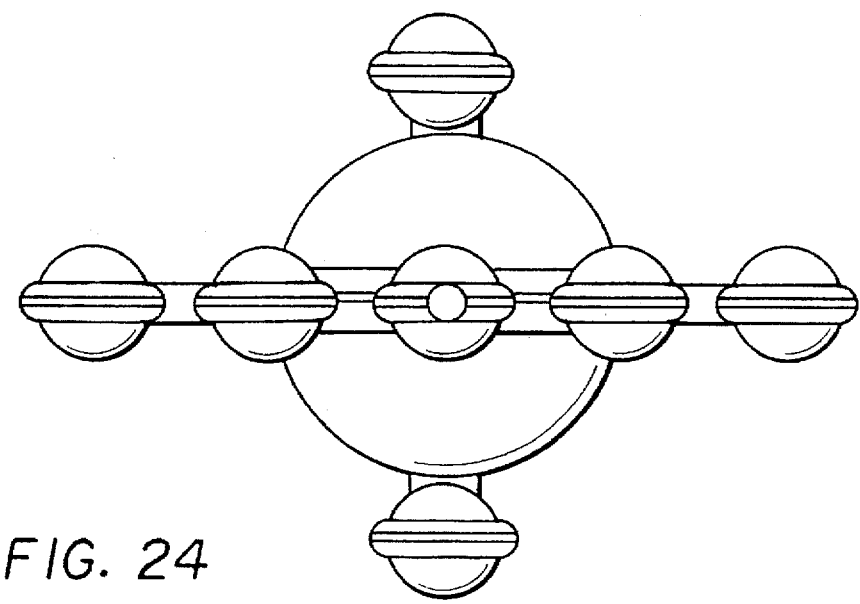
FIG. 24 is an end elevational representation of a possible structure which can be built by the novel process.
Figure 25:
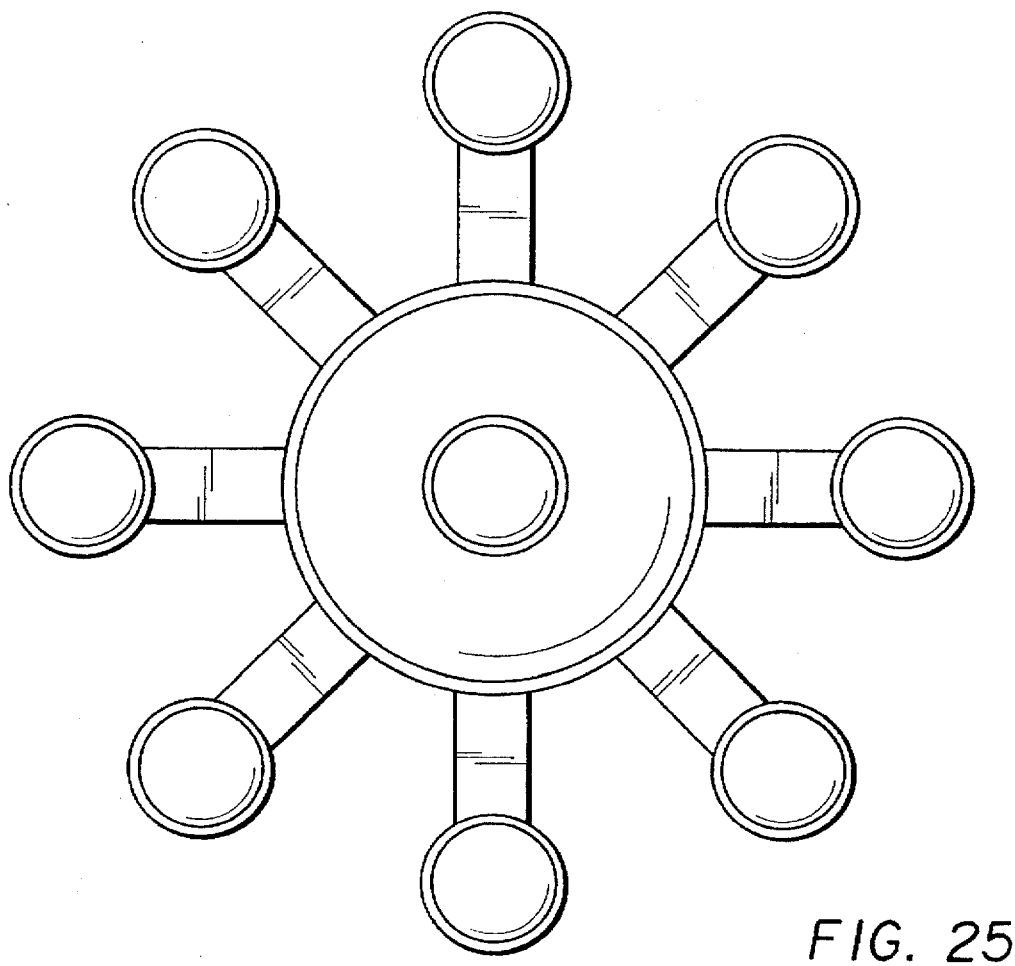
FIG. 25 is a top plan view of the representation of FIG. 24.

A planetary arrangement of structures enclosing habitations and solidified walls is shown in FIG. 24. As enabled by selection of soft and hard mounting connections, some structures will rotate with respect to others. A plan view of the arrangement of FIG. 24 is shown in FIG. 25.

It will thus be appreciated that complicated, interlocked objects can be molded in outer space. These objects can be built progressively by successive mold inflation and injection operations. The molded objects can be solidly fixed to one another, or may be rotatably assembled together by providing sealed bearing packages. Preferably, human habitations made from cylindrical and spherical modules are so formed, and passage or access from module to module are provided.

It is to be understood that the present invention is not limited to the sole embodiment described above, but encompasses any and all embodiments within the scope of the following claims.

I claim:

1. A method of producing a rigid structure from a flexible, inflatable, multi-walled mold having an innermost flexible wall and at least one outer flexible wall, thus defining a cavity between each adjacent wall, comprising the steps of:

attaching supports to each of said flexible walls for maintaining said flexible walls in a predetermined configuration when the mold is inflated, said supports being a plurality of flexible webs, rigid telescopic bars, and fasteners;

placing a magnetic member in one of said flexible walls, and a magnetically responsive member in another of said flexible walls for maintaining said one of said flexible walls and said another of said flexible walls in alignment by magnetic attraction and repulsion;

injecting pressurized gas into at least one outer cavity located externally of the innermost flexible wall to provide an expanded shape for the mold, thereby defining an innermost cavity surrounded by the innermost flexible wall;

injecting mold material into said innermost cavity;

deflating said at least one outer cavity after the mold material within the innermost cavity has hardened; and injecting another mold material into said at least one outer cavity which was deflated during said deflating step.

2. The method according to claim 1 further comprising the step of disposing an internal lock on said at least one outer flexible wall before said step of injecting pressurized gas into said at least one outer cavity.

3. The method according to claim 1 further comprising the step of disposing a sealed bearing package on said at least one outer flexible wall before said step of injecting pressurized gas into said at least one outer cavity.

4. The method according to claim 3 further comprising the step of disposing a motor, gear, and shaft on said at least one outer flexible wall before said step of injecting pressurized gas into said at least one outer cavity.

5. A method of producing a rigid structure from a flexible, inflatable, multi-walled mold having an innermost flexible wall and a plurality of outer flexible walls, said method comprising the steps of:

attaching supports to each of said flexible walls for maintaining said flexible walls in a predetermined configuration when the mold is inflated, said supports being a plurality of flexible webs, rigid telescopic bars, and fasteners;

placing a magnetic member in one of said flexible walls, and a magnetically responsive member in another of said flexible walls for maintaining said one of said flexible walls and said another of said flexible walls in alignment by magnetic attraction and repulsion;

injecting pressurized gas into at least one first outer cavity located externally of the innermost flexible wall to provide an expanded shape for the mold, thereby defining an innermost cavity surrounded by the innermost flexible wall;

injecting mold material into at least one second outer cavity;

deflating said at least one first outer cavity after the mold material within said at least one second outer cavity has hardened; and injecting another mold material into said at least one first outer cavity which was deflated during said deflating step.

6. The method according to claim 5 further comprising the step of disposing a sealed bearing package on at least one outer flexible wall before said step of injecting pressurized gas into said at least one first outer cavity.

7. The method according to claim 5 further comprising the step of disposing a motor, gear, and shaft on at least one outer flexible wall before said step of injecting pressurized gas into said at least one first outer cavity.

8. The method according to claim 5 further comprising the step of disposing an internal lock on at least one outer flexible wall before said step of injecting pressurized gas into said at least one first outer cavity.

* * * * *